United States Patent
Ahlander et al.

(10) Patent No.: US 7,587,488 B2
(45) Date of Patent: Sep. 8, 2009

(54) DYNAMIC BACKGROUND RATER FOR INTERNET CONTENT

(75) Inventors: John Lyman Ahlander, Orem, UT (US); J. Michael Fonnesbeck, Lehi, UT (US); Nathan David Toone, Layton, UT (US); Mikko Valimaki, Orem, UT (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 825 days.

(21) Appl. No.: 10/940,701

(22) Filed: Sep. 14, 2004

(65) Prior Publication Data
US 2005/0060404 A1    Mar. 17, 2005

Related U.S. Application Data

(60) Provisional application No. 60/503,140, filed on Sep. 15, 2003.

(51) Int. Cl.
 *G06F 15/173* (2006.01)
(52) U.S. Cl. .................. 709/224; 709/223; 709/225
(58) Field of Classification Search .......... 709/223–225
 See application file for complete search history.

(56) References Cited

U.S. PATENT DOCUMENTS

| | | | |
|---|---|---|---|
| 5,987,606 A | 11/1999 | Cirasole et al. | |
| 5,987,611 A | 11/1999 | Freund | |
| 6,141,694 A | 10/2000 | Gardner | |
| 6,233,618 B1 | 5/2001 | Shannon | |
| 6,463,454 B1 * | 10/2002 | Lumelsky et al. | 718/105 |
| 6,604,131 B1 * | 8/2003 | Warris et al. | 709/205 |
| 6,606,659 B1 | 8/2003 | Hegli et al. | |
| 7,370,285 B1 * | 5/2008 | Nickerson et al. | 715/808 |
| 7,409,376 B2 * | 8/2008 | Jameson | 706/45 |
| 2003/0188150 A1 * | 10/2003 | Ohkado et al. | 713/150 |

* cited by examiner

*Primary Examiner*—Yves Dalencourt
*Assistant Examiner*—Michael C Lai
(74) *Attorney, Agent, or Firm*—Sonnenschein Nath & Rosenthal LLP

(57) ABSTRACT

The present invention extends to methods, systems, and computer program products for dynamically rating Internet content. A computer receives an indication that at least one URL is available to be rated and that resources (e.g., a content rater) are available for rating the URL. The computer selects a URL, which identifies a portion of Internet content, and transfers the URL to at least two different content classifiers. The computer accesses first rating data corresponding to the identified portion of Internet from a first content classifier. The computer accesses second rating data corresponding to the identified portion of Internet from a second content classifier. The computer combines at least the first rating data and the second rating data into a combined rating corresponding to a specified content category. The computer indicates that the identified portion of Internet content is included in the specified content category.

13 Claims, 5 Drawing Sheets

DYNAMIC BACKGROUND RATER FOR INTERNET CONTENT

CROSS-REFERENCE TO RELATED APPLICATIONS

The present application claims the benefit of U.S. Provisional Patent Application Ser. No. 60/503,140, filed Sep. 15, 2003, and entitled "Dynamic Background Rater", which is herein incorporated by reference in its entirety.

BACKGROUND OF THE INVENTION

1. The Field of the Invention

The invention generally relates to rating Internet content. More specifically, the invention relates to dynamically generating Internet-content ratings

2. The Relevant Technology

The Internet is a vast repository of information. The Internet allows individuals, companies, and other organizations to author and publish information that becomes readily available to Internet users. In addition to information, the websites may also offer services and entertainment functions. The Internet allows the interconnection of various content servers. For instance, there exist numerous software programs that allow quick and cheap authoring and publication of web-page documents to web-page document servers. These factors have resulted in the continued proliferation Internet-based content, at an astounding rate. New content, such as, for example, Web sites and Web pages, is added to the Internet on a daily basis.

Unfortunately, there is limited, if any, editorial control over what is published on the Internet. In general, there are virtually no standards for accuracy and in many cases little or no standards for decency. Further, the ubiquity of the Internet allows content legal posted at first physical location (e.g., first state or country) to be accessed from second physical location (e.g., a second state or country) where the content may be illegal. For example, a gambling web site may be operated from a physical location that allows legalized gambling but accessed in a second location where gambling is illegal.

The ready availability of questionable and potentially illegal material has also created various problems in corporate and home environments. In the corporate environment, an employee's ability to access pornography or other objectionable material may create a hostile work environment for other employees subjecting the corporation to various legal liabilities. Additionally, employee productivity may suffer as a result of employees accessing the Internet for personal reasons while the employees should be performing company tasks.

In a home environment, parents may have an interest in controlling the content in web-page documents accessible by children or others in the home. Unfortunately, Internet Service Providers ("ISPs") and Web-page operators typically provide little protection to prevent children from accessing sites that may include pornography, gambling, hate and racism, and other potentially undesirable content.

Accordingly, various Web filtering mechanisms have been developed to block electronic content, for example, based on a domain or URL associated with the electronic content. Web filtering mechanisms typically place domains and/or URLs into content categories (e.g., sports, legal, technology, news, etc.). An administrator can then assign user access rights to each content category. For example, the administrator of can configure a Web filtering product (a desktop computer, gateway, caching device, firewall, etc.) to permit or block user access to content categories. Access rights to particular content categories can be based on personal or organizational Internet access policies. For example, an organizational policy can require blocking access to gambling and adult content sites, while allowing access to all other sites.

However, Web site operators are aware that such filtering mechanisms exists and often take measures to attempt to counter the filtering mechanisms. For example, Web site operators can frequently change URLs, Internet Protocol ("IP") addresses, or domain names or include content form other categories in their Web-based content. Thus, Web sites that do not want to be blocked, like pornography and gambling Web sites, are constantly varying their configuration to circumvent filtering systems and filtering companies. This adds a new level of difficulty to the filtering process, since rules that are currently valid for blocking Web sites might not be valid in the future.

Conventionally, some filtering of web-page documents is done by software installed on client computers. However, this requires constant updating of a database on the client to maintain a list of content categories and, for example, approved and non-approved sites. Additionally, this client side filtering software may be disabled by tech savvy employees or children. Further, software installed on a client provides no provision for new sites or new web-page documents that are added to the Internet between database updates.

Accordingly, there have been at least some attempts to implement automated and/or server-based approaches to Internet content filtering. However, the ever-increasing and ever changing Web-based content causes many of these approaches to suffer from the same problems (e.g., accuracy) associated with client side filtering. Accordingly, what would be advantageous are mechanisms for dynamically rating Internet content.

BRIEF SUMMARY OF THE INVENTION

The foregoing problems with the prior state of the art are overcome by the principles of the present invention, which are directed towards methods and computer program products for dynamically rating Internet content. In some embodiments, a computer system dispatches an Internet-content identifier (e.g., a Uniform Resource Locator ("URL")) to a content-rating system. The computer system receives an indication that at least one unrated Internet-content identifier is available to be rated. The computer system receives an indication that resources (e.g., a content rater) are available for rating the unrated Internet-content identifier. The computer system selects an Internet-content identifier from among the at least one unrated Internet-content identifier based on content-identifier selection criteria. The computer system selects some of the available resources to rate the unrated Internet-content identifier. The computer system transfers the selected Internet-content identifier to the selected available resources.

In other embodiments, a computer system rates Internet content. The computer system receives an Internet-content identifier that identifies a portion of Internet content. The computer system transfers the Internet-content identifier to at least two different content classifiers. The computer system accesses first rating data corresponding to the identified portion of Internet content from a first content classifier. The computer system accesses second rating data corresponding to the identified portion of Internet content from a second content classifier. The computer system combines at least the first rating data and the second rating data into a combined rating corresponding to a specified content category. The computer system indicates that the identified portion of Internet content is included in the specified content category (e.g., sports, news, education, etc.)

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
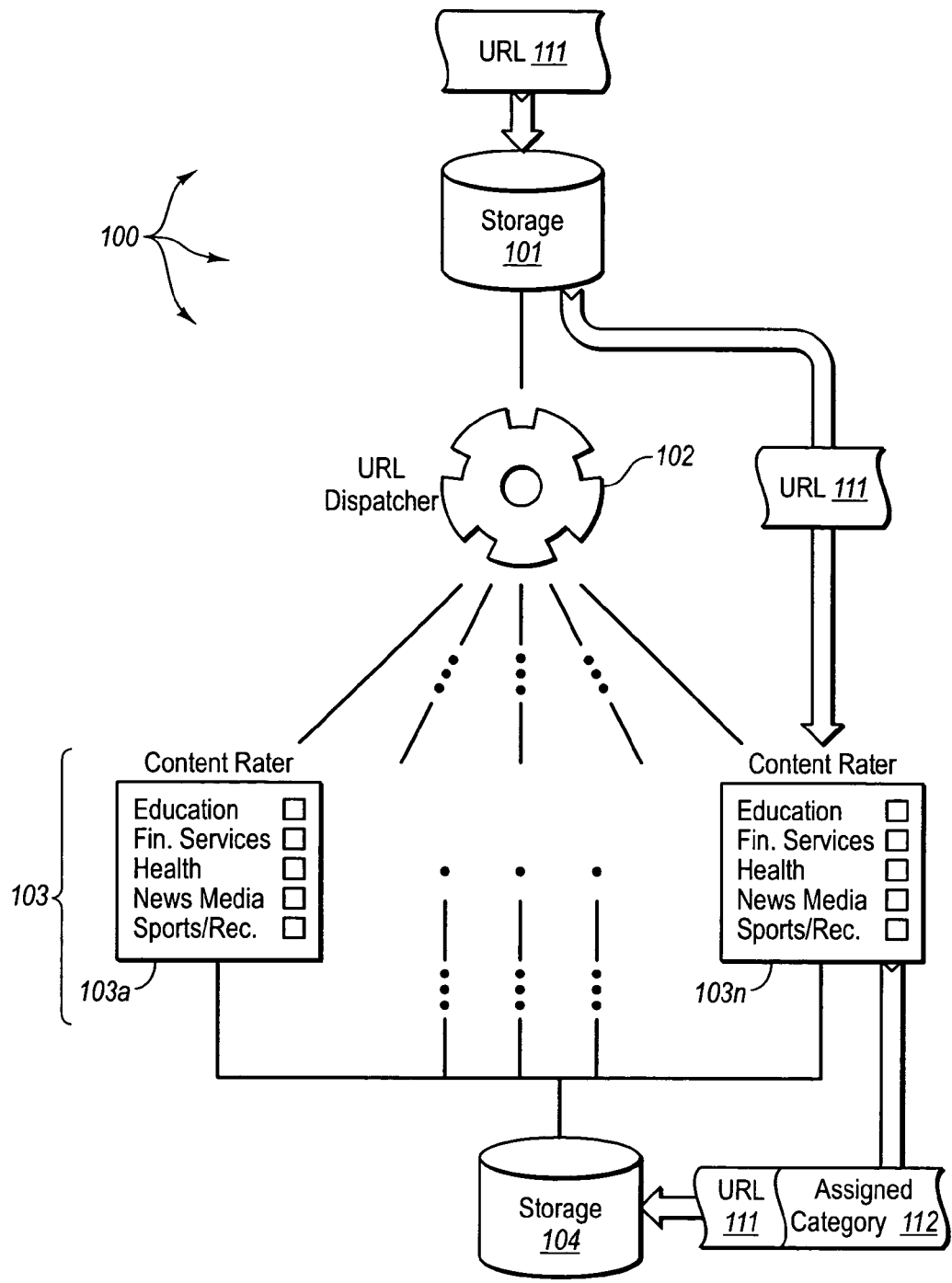
FIG. 1 illustrates an example of a computer architecture that facilitates dispatching unrated Internet-content identifiers to resources that can rate the unrated Internet-content identifiers.

The principles of the present invention provide for dynamically rating Internet content. In some embodiments, a computer system dispatches an Internet-content identifier (e.g., a Uniform Resource Locator ("URL")) to a content-rating system. The computer system receives an indication that at least one unrated Internet-content identifier is available to be rated. The computer system receives an indication that resources (e.g., a content rater) are available for rating the unrated Internet-content identifier. The computer system selects an Internet-content identifier from among the at least one unrated Internet-content identifier based on content-identifier selection criteria. The computer system selects some of the available resources to rate the unrated Internet-content identifier. The computer system transfers the selected Internet-content identifier to the selected available resources.

In other embodiments, a computer system rates Internet content. The computer system receives an Internet-content identifier that identifies a portion of Internet content. The computer system transfers the Internet-content identifier to at least two different content classifiers. The computer system accesses first rating data corresponding to the identified portion of Internet content from a first content classifier. The computer system accesses second rating data corresponding to the identified portion of Internet content from a second content classifier. The computer system combines at least the first rating data and the second rating data into a combined rating corresponding to a specified content category. The computer system indicates that the identified portion of Internet content is included in the specified content category (e.g., sports, news, education, etc.)

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system to cause the general-purpose computer system or special-purpose computer system to perform a certain function or group of functions. Computer-executable instructions include, for example, binaries, intermediate format instructions such as assembly language, interpretable code, or even source code.

As used herein, the term "module" or "component" refers to software objects or routines that execute on the computing system. Computer-executable instructions can be included in different components, modules, engines, and services described herein and may be implemented as objects or processes that execute on the computing system (e.g., as separate threads). While the system and methods described herein are preferably implemented in software, implementations in software and hardware or hardware are also possible and contemplated.

FIG. 1 illustrates an example of a computer architecture 100 that facilitates dispatching unrated Internet-content identifiers to resources that can rate the unrated Internet-content identifiers. Computer architecture 100 utilizes a distributed architecture, which allows for scalability of the entire system by allowing multiple content-rating machines to be connected simultaneously to the system.

The components of computer architecture 100 can be included in a Local Area Network ("LAN"), Wide Area Network ("WAN"), or even the Internet. Accordingly, other computer systems can exchange data, such as, for example, URLs, electronic mail message, and Web pages, with the components of computer architecture 100. Data can be exchanged using various protocols, such as, for example, Internet Protocol ("IP"), Transmission Control Protocol ("TCP"), and HyperText Transfer Protocol ("HTTP").

In some embodiments, unrated Uniform Resource Locators ("URLs"), such as, for example, URL 111 are received and stored in storage 101. Storage 101 can be any type of computer-readable media, such as, for example, a magnetic disk or Random Access Memory ("RAM"). While a URL is one mechanism for identifying Internet-content, it should be understood that the embodiments of the present invention are not limited to URLs. It would be apparent to one skilled in the art, after having reviewed this description, that other mechanisms, in addition to URLs, can be used to identify and/or locate Internet content. For example, Uniform Resource Names ("URNs") and other types of Uniform Resource Identifiers ("URIs") may be also used to identify Internet content.

In computer architecture 100, URL dispatcher 102 manages the retrieval and subsequent dispatch of URLs from the unrated storage 101 to the content raters 103a through 103n (e.g., java objects). A series of three periods (and ellipsis) indicates that one or more additional content raters can be included between content rater 103a and content rater 103n. URL dispatcher 102 monitors the availability of unrated URLs stored at storage 101, as well as the availability of content raters included in content raters 103 to rate unrated URLs. When an unrated URL and a content rater are available, URL dispatcher 102 can dispatch the available unrated URL (e.g., URL 111) to the available content rater for subsequent rating. For example, within system memory and/or over a network, URL dispatcher 102 can transfer unrated URLs from storage module 101 to content rating modules 103.

Each content rater 103a through 103n independently rates content identified by a received URL. It would be apparent to one skill in the art, after having reviewed this description, that this distributed system at least in part facilitates the scalability of the content rater modules 103. Accordingly, the number of content raters can be efficiently adjusted (increased or decreased) based on demands for assigning content ratings. Content raters included in content raters 103 can be implemented as a single process thread and can be implemented at the same computer system or distributed across a plurality of different computer systems.

Each content rater 103a through 103n assigns the identified content to a specified (and potentially predetermined) content category. Content categories can include, for example, Education, Financial Services, Health, News/Media, and Sports/Recreation, as depicted. Assigned content categories are stored in the Rated URL Storage module 104. A rated URL (e.g., URL 111) can be stored in storage 104 along with an indication of the content category (e.g., content category 112) that was assigned to the identified content. Storage 104 can be any type of computer-readable media, such as, for example, a magnetic disk or Random Access Memory ("RAM"). Storage 101 and storage 104 may be located at a single physical device, such as, for example, a magnetic hard disk.

Figure 3:
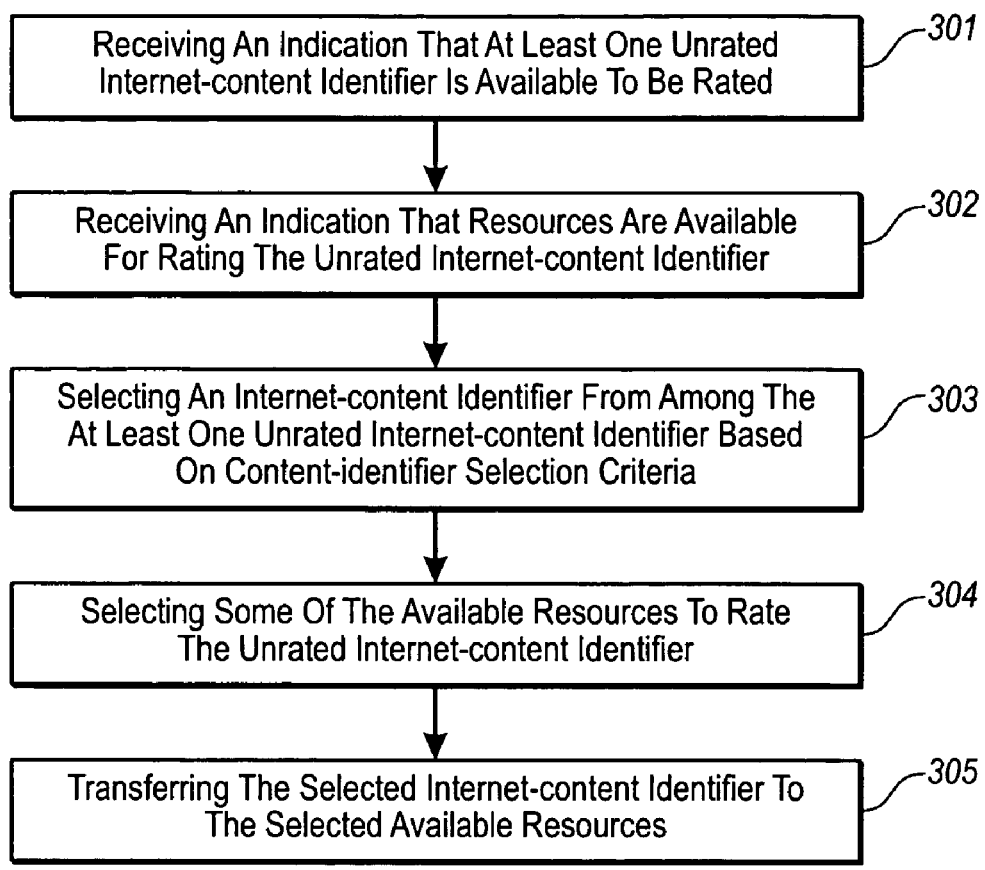
FIG. 3 illustrates an example flowchart of a method for dispatching unrated Internet-content identifiers to resources that can rate the unrated Internet-content identifiers.

FIG. 3 illustrates an example flowchart of a method 300 for dispatching unrated Internet-content identifiers to resources that can rate the unrated Internet-content identifiers. The method 300 will be described with respect with respect to the modules and data depicted in computer architecture 100.

Method 300 includes an act of receiving an indication that at least one unrated Internet-content identifier is available to be rated (act 301). For example, URL dispatcher 102 can receive an indication that URL 111 (stored at storage 101) is available to be rated. Inter-process and/or network messaging can be used to notify URL dispatcher 102 of unrated URLs stored at storage 101.

Method 300 includes an act of receiving an indication that resources are available for rating the unrated Internet-content identifier (act 302). For example, URL dispatcher 102 can receive an indication that one or more content raters included in content raters 103 are available to rate URL 111. Content raters 103 can intermittently or in response to some event (e.g., completion of rating a prior URL) communicate with URL dispatcher 102 to indicate availability to rate a URL. Alternately, URL dispatcher 102 can from time to time query content raters 103 to identify available content raters 103a through 103n. Inter-process and/or network messaging can be used to notify URL dispatcher 102 of available content raters included in content raters 103.

Method 300 includes an act of selecting an Internet-content identifier from among the at least one unrated Internet-content identifier based on content-identifier selection criteria (act 303). For example, URL dispatcher 102 can select URL 111 from among other URLs stored at storage 111. Content-identifier selection criteria can include, for example, selecting an Internet-content identifier randomly, based on a priority, based on wait time (e.g., in a queue), based on an indication of the entity that is requesting rating, based on policies of a rating service provider, based on a number of requests to rate the Internet-content identifier, etc.

For example, an unrated URL submitted by a premium customer may be given selection priority over an unrated URL submitted by a standard customer. It may also be that a content rater is specifically allocated for unrated URLs from a specified customer. Thus, when a URL from the specified customer is received, the URL may be selected when the specifically allocated server becomes available.

Method 300 includes an act of selecting some of the available resources to rate the unrated Internet-content identifier (act 304). For example, URL dispatcher 102 can select content rater 103n, from among content raters 103, to rate URL 111. A content rater can be selected, for example, randomly, based on how long the content rater has been idle, based on policies or a rating service provider, etc. In some embodiments, a content rater is selected based on URL specific criteria, such as, for example, the priority of a selected URL, the sender of a selected URL, etc. For example, as previously described when a URL is from a specified customer, a specifically allocated server can be selected.

Method 300 includes an act of transferring the selected Internet-content identifier to the selected available resources (act 305). For example, URL dispatcher 102 can dispatch URL 111 to content rater 103n. Content rater 103n can determine a content category rating for the URL 111. For example, content rater 103n can determine that URL 111 is in sports category 112. Content rater 103n can store education category 112 along with URL 111 at storage 104.

Thus, from time to time, other computer systems can submit URLs to storage 101 to have the submitted URLs rated. The other computer systems can subsequently refer back to storage 104 to access ratings for submitted URLs. Accordingly, these other computer systems may be relieved from having to maintain content filtering software.

Figure 2:
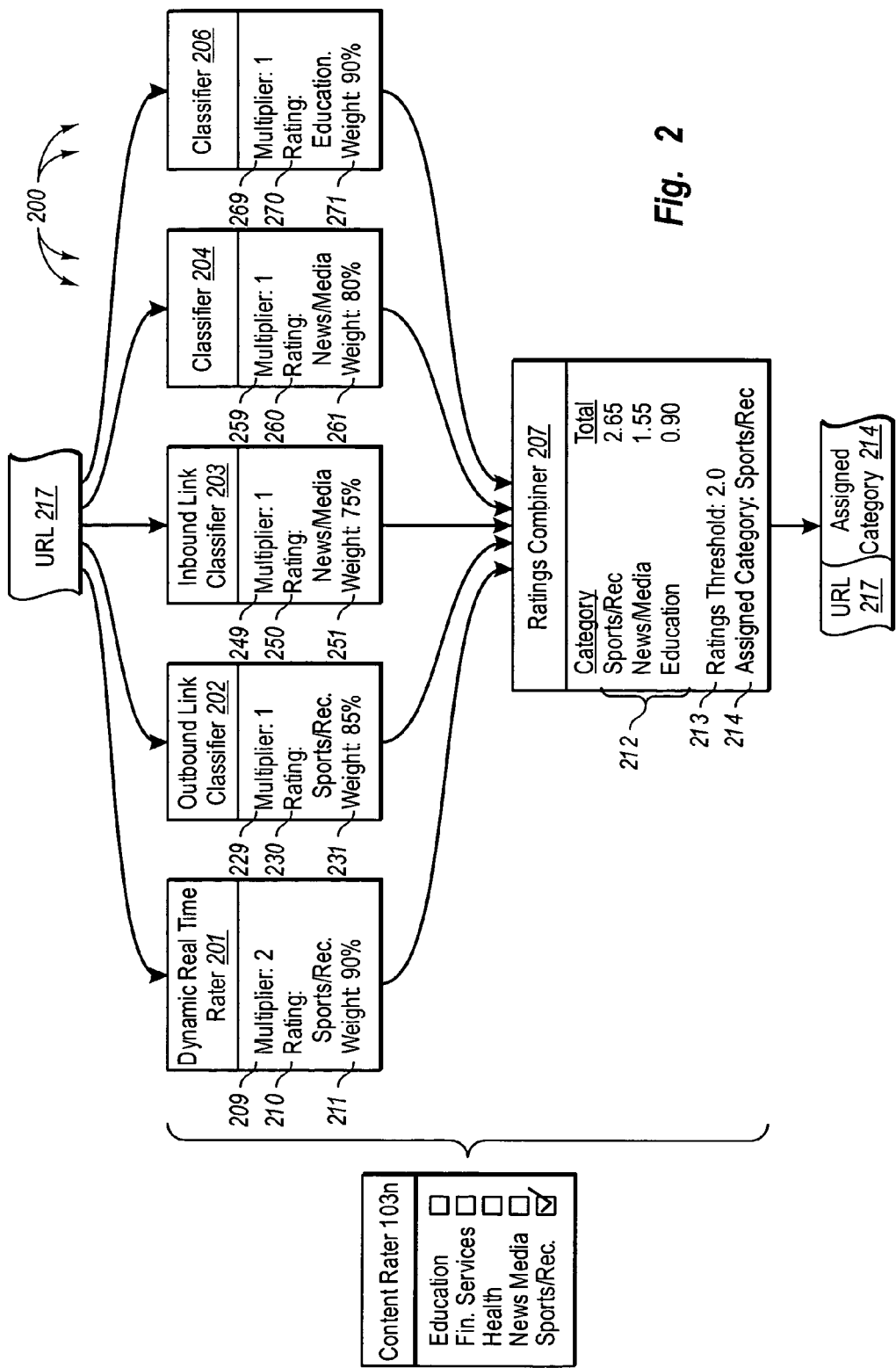
FIG. 2 illustrates an example of a computer architecture, including a detailed view of a content rater, that facilitates rating Internet content.

FIG. 2 illustrates an example of computer architecture 200, including a more detailed view of content rater 103n, that facilitates rating Internet content. Content rater 103n can utilize a distributed plurality of classifiers. Each classifier can be configured to rate content based on different criteria and/or algorithms. Thus, Web site content can be analyzed using a variety of different mechanisms (instead of a single rating source) that are combined in to a single, potentially much more accurate, rating.

Each classifier can be given a rating multiplier. A classifier's rating multiplier indicates the relative precision of the classifier, for example, based on the prior accuracy of the classifier, compared to other classifiers. A higher rating multiplier can indicate that a corresponding classifier is relatively more accurate than a classifier with a lower rating multiplier.

As depicted in computer architecture 200, content rater 103n includes dynamic real time rater 201, outbound link classifier 202, inbound link classifier 203, classifier 204, and classifier 206. When content rater 103n receives an unrated URL (e.g., URL 217) from URL dispatcher 102, content rater 103n can provide the unrated URL to each classifier in the plurality of classifiers. For example, content rater 103n can provide URL 217 as input to dynamic real time rater 201, outbound link classifier 202, inbound link classifier 203, classifier 204, and classifier 206.

Dynamic real time rater 201 can rate content identified by a URL by examining the characteristics of the content. For example, dynamic real time rater 201 can parse content and determine if the content has characteristics corresponding to a particulate content category. It may be that dynamic real time rater 201 compares content to a database of characteristics to attempt to match (e.g., word matching or image matching) the content with a particular content category. Dynamic real time rater 201 can provide content ratings in essentially real-time. Dynamic Real Time Rater 201 assigns a content rating (e.g., rating 210), corresponding to a content category (e.g., sports and recreation), and a weight (e.g., weight 211) based on the probable accuracy of the assigned content rating (e.g., 90%).

Outbound link classifier 202 can rate content identified by a URL based on the ratings of outbound links contained in the identified content (e.g., embedded URLs) that identify other content. For example, URL #1 may identify a first portion of Internet content. Contained in the first portion of Internet content may be URL #2 and URL #3, that identify (or link to) a other corresponding portions of Internet content. Accordingly, outbound link classifier 202 can utilize the rating of URL #2 and URL #3 when rating content identified by URL #1. Outbound link classifier 202 assigns a content rating (e.g., rating 230), corresponding to a content category (e.g., sports and recreation), and a weight (e.g., weight 231) based on the probable accuracy of the assigned content rating (e.g., 85%).

Inbound link classifier 203 can rate content identified by a URL based on the ratings of outbound links from other content to the content identified by the URL. For example, when content identified by both URL #4 and URL #5 contain URL #6, inbound link classifier 203 can utilize the rating of URL #4 and URL #5 when rating content identified by URL #6. Inbound link classifier 203 assigns a content rating (e.g., rating 250), corresponding to a content category (e.g., news and media), and a weight (e.g., weight 251) based on the probable accuracy of the assigned content rating (e.g., 75%).

Classifiers 204 and 206 can use other classification criteria and classification algorithms (e.g., based on other rated and unrated related content) to rate identified Internet content. Classifier 204 assigns a content rating (e.g., rating 260), corresponding to a content category (e.g., news and media), and a weight (e.g., weight 261) based on the probable accuracy of the assigned content rating (e.g., 80%). Classifier 206 assigns a content rating (e.g., rating 270), corresponding to a content category (e.g., education), and a weight (e.g., weight 261) based on the probable accuracy of the assigned content rating (e.g., 85%).

Ratings combiner 207 can receive content ratings, weights, and multipliers from a plurality of classifiers and combine the content ratings, weights, and multipliers into a combined rating for identified Internet content. For example, ratings combiner 207 can combine ratings, weights, and multipliers from each of dynamic real time rater 201, outbound link classifier 202, inbound link classifier 203, related rated classifier 204, and related unrated classifier 206 into a combined rating for content identified by URL 217. Calculating a combined rating can include calculating points based on ratings, weights, and multipliers.

For example, ratings combiner 206 can calculate 1.8 points (2*0.9) for the content category sports and recreation based on multiplier 209, rating 210, and weight 211. Ratings combiner 206 can calculate 0.85 points (1*0.85) for the content category sports and recreation based on multiplier 229, rating 230, and weight 231. Ratings combiner 206 can calculate 0.75 points (1*0.75) for the content category news and media based on multiplier 249, rating 250, and weight 251. Ratings combiner 206 can calculate 0.8 points (1*0.8) for the content category news and media based on multiplier 259, rating 260, and weight 261. Ratings combiner 206 can calculate 0.85 points (1*0.85) for the content category education based on multiplier 269, rating 270, and weight 271.

Ratings combiner 207 can total points for each category as depicted by table 212. Rated content can be assigned to a specified category, when the total points for the category exceed a threshold (e.g., threshold 213). For example, content identified by URL 217 is assigned to the sports and recreation category since the total points for sports and recreation (2.65) exceeds threshold 213 (2.0). Ratings combiner 207 can store URLs along with corresponding ratings. For example, URL 217 can be stored along with assigned category 214.

Threshold rating 213 can be adjusted to increase the amount of content that is assigned a content rating or increase the accuracy associated with assigned content ratings. For example, as ratings threshold 213 is increased, content ratings will become more and more accurate (since more points are needed to satisfy the ratings threshold). On the other hand, as the ratings threshold 213 is decreased, the amount of content that can be assigned a content rating increases (since fewer points are needed to satisfy the ratings threshold). Accordingly, an administrator can adjust threshold rating 213 to tune content rating system.

Figure 4:
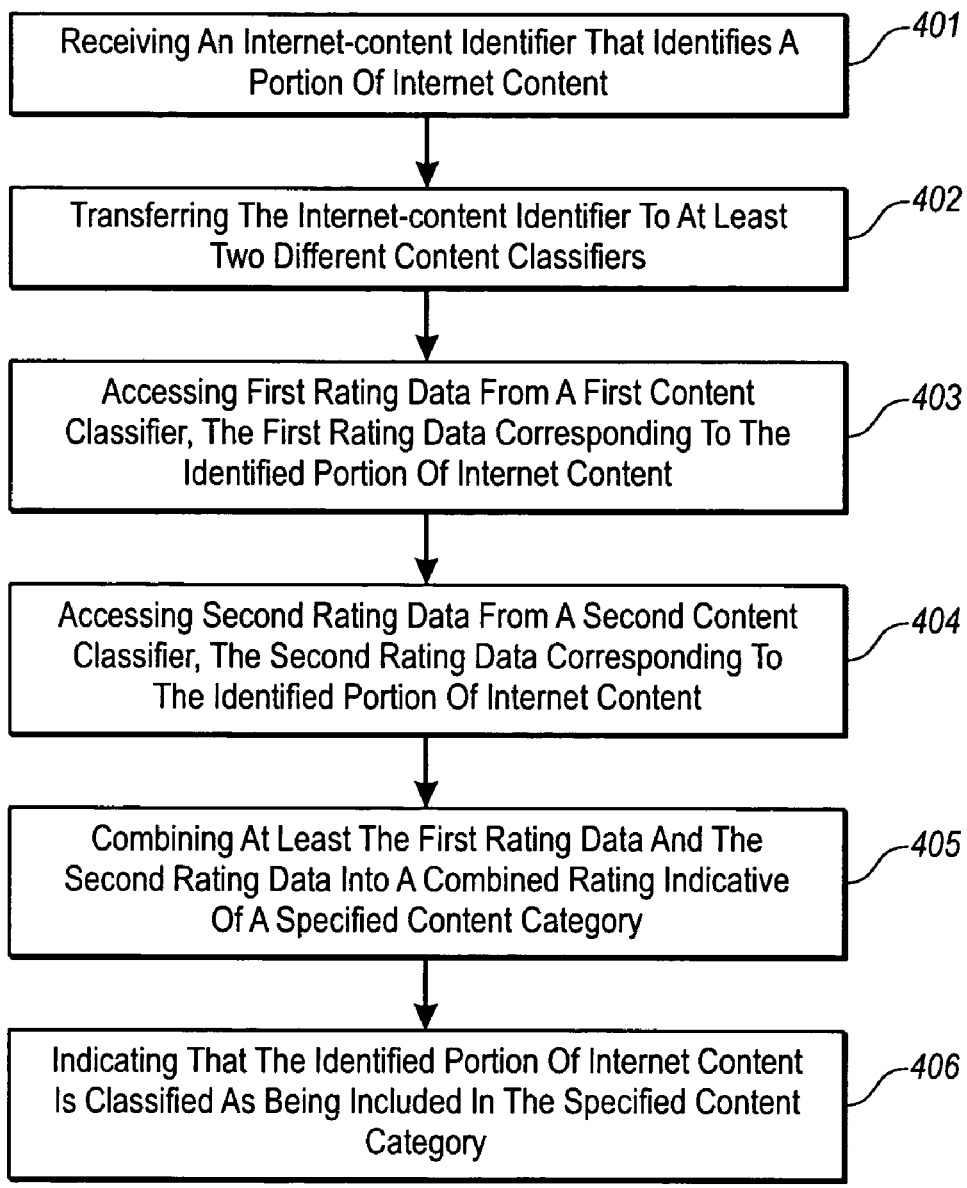
FIG. 4 illustrates an example flowchart of a method for rating Internet content.

FIG. 4 illustrates an example flowchart of a method 400 for rating Internet content. The method 400 will be described with respect to the data and modules in computer architecture 200.

Method 400 includes an act of receiving an Internet-content identifier that identifies a portion of Internet content (act 401). For example, content identified 103$n$ can receive URL 217 that identifies a Web page. Method 400 includes an act of transferring the Internet-content identifier to at least two different content classifiers (act 402). For example, content rater 103$n$ can provide URL 217 as input to at least two of dynamic real time rater 201, outbound link classifier 202, inbound link classifier 203, classifier 204, and classifier 206.

Method 400 includes an act of accessing first rating data from a first content classifier, the first rating data corresponding to the identified portion of Internet content (act 403). Method 400 includes an act of accessing second rating data from a second content classifier, the second rating data corresponding to the identified portion of Internet content (act 404). For example, ratings combiner 207 can receive a multiplier, rating, and weight from at least two of dynamic real time rater 201, outbound link classifier 202, inbound link classifier 203, classifier 204, and classifier 206.

Method 400 includes an act of combining at least the first and second rating data into a combined rating indicative of a specified content category (act 405). For example, ratings combiner 207 can combine corresponding multipliers, ratings, and weights from at least two of dynamic real time rater 201, outbound link classifier 202, inbound link classifier 203, classifier 204, and classifier 206. Method 400 includes an act of indicating that the identified portion of Internet content is classified as being included in the specified content category (act 406). For example, ratings combiner 207 can indicate that URL 217 is classified as being included in a sports and recreation category.

In some embodiments, components of computer architecture 100 and 200 are implemented as Java classes. For example, URL dispatcher 102, content raters 103$a$ through 103$n$, dynamic real time rater 201, outbound link classifier 202, inbound link classifier 203, classifier 204, and classifier 206 are implemented as Java classes.

A dynamic rating thread can manage the rating life cycle of a URL as the URL is rated. A thread retrieves a URL from the URL dispatcher 102, passes the URL through a rating generator (e.g., classifiers 201, 202, 203, 204 & 206), transfers the URL to a ratings combiner 207 to receive the rating, and finally stores the rating along with the URL. A thread manager can launch and manage all dynamic rating threads in a memory space.

Rating generators can inherit from a base RatingGenerator Java class, thus implementing the abstract methods that allow computer architectures 100 and 200 to access ratings from each classifier. New classifiers can be designed to inherit from the base RatingGenerator and thus can be efficiently integrated into an existing rating architecture.

In another embodiment of the invention, content categories are arranged in a hierarchy. Content categories that are higher in the hierarchy can contained one or more lower sub-content categories. For example, a higher level sports category can include lower level football, baseball, soccer, and basketball categories. Thus, when content is being rated, a content rater can attempt to rate content into a lower level category (e.g., baseball). If the content rater is unable to obtain a rating for the lower level category, the content rater next attempts to rate the content into a corresponding higher level category (e.g., sports).

Thus, a content rater may be able to provide a more general content rating (e.g., sports), when content is not distinguishable between a plurality of more specific content categories (e.g., soccer and football). That is, points for more specific content categories do not exceed a ratings threshold. In some environments, a more general content rating may be over no rating.

Embodiments of the present invention can be included in a general filtering system that provides up-to-date ratings for newly discovered, or recently relocated, Internet content. The filtering system can rate Web sites that have been accessed by users, but that are not yet known to the filtering system. For example, accessed URLs can be logged into an unrated database table, which are then processed by a dynamic background rating process. Once rated, these new ratings are then pushed to a rated database table and then pushed out to filtering service points accessible to customers.

Figure 5:
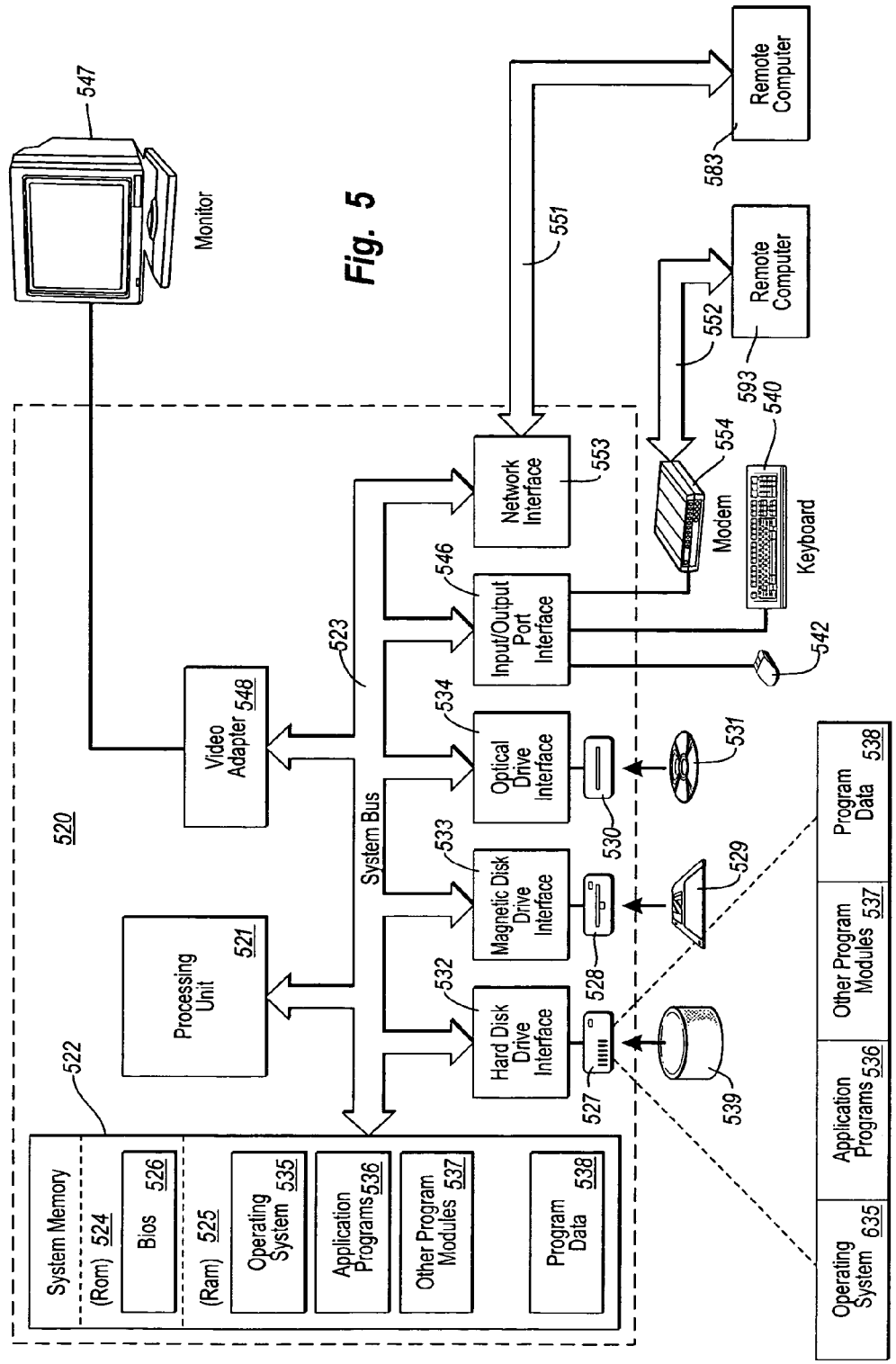
FIG. 5 illustrates a suitable operating environment for the principles of the present invention.

FIG. 5 illustrates a suitable operating environment for the principles of the present invention. FIG. 5 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 5, an example system for implementing the invention includes a general-purpose computing device in the form of computer system 520, including a processing unit 521, a system memory 522, and a system bus 523 that couples various system components including the system memory 522 to the processing unit 521. Processing unit 521 can execute computer-executable instructions designed to implement features of computer system 520, including features of the present invention. The system bus 523 may be any of several types of bus structures including a memory bus or memory controller, a peripheral bus, and a local bus using any of a variety of bus architectures. The system memory includes read only memory ("ROM") 524 and random access memory ("RAM") 525. A basic input/output system ("BIOS") 526, containing the basic routines that help transfer information between elements within computer system 520, such as during start-up, may be stored in ROM 524.

The computer system 520 may also include magnetic hard disk drive 527 for reading from and writing to magnetic hard disk 539, magnetic disk drive 528 for reading from or writing to removable magnetic disk 529, and optical disk drive 530 for reading from or writing to removable optical disk 531, such as, or example, a CD-ROM or other optical media. The magnetic hard disk drive 527, magnetic disk drive 528, and optical disk drive 530 are connected to the system bus 523 by hard disk drive interface 532, magnetic disk drive-interface 533, and optical drive interface 534, respectively. The drives and their associated computer-readable media provide non-volatile storage of computer-executable instructions, data structures, program modules, and other data for the computer system 520. Although the example environment described herein employs magnetic hard disk 539, removable magnetic disk 529 and removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 539, magnetic disk 529, optical disk 531, ROM 524 or RAM 525, including an operating system 535, one or more application programs 536, other program modules 537, and program data 538. A user may enter commands and information into computer system 520 through keyboard 540, pointing device 542, or other input devices (not shown), such as, for example, a microphone, joy stick, game pad, scanner, or the like. These and other input devices can be connected to the processing unit 521 through input/output interface 546 coupled to system bus 523. Input/output interface 546 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 547 or other display device is also connected to system bus 523 via video interface 548. Other peripheral output devices (not shown), such as, for example, speakers and printers, can also be connected to computer system 420.

Computer system 520 is connectable to networks, such as, for example, an office-wide or enterprise-wide computer network, a home network, an intranet, and/or the Internet. Computer system 520 can exchange data with external sources, such as, for example, remote computer systems, remote applications, and/or remote databases over such networks.

Computer system 520 includes network interface 553, through which computer system 520 receives data from external sources and/or transmits data to external sources. As depicted in FIG. 5, network interface 553 facilitates the exchange of data with remote computer system 583 via link 551. Network interface 553 can logically represent one or more software and/or hardware modules, such as, for example, a network interface card and corresponding Network Driver Interface Specification ("NDIS") stack. Link 551 represents a portion of a network (e.g., an Ethernet segment), and remote computer system 583 represents a node of the network.

Likewise, computer system 520 includes input/output interface 546, through which computer system 520 receives data from external sources and/or transmits data to external sources. Input/output interface 546 is coupled to modem 554 (e.g., a standard modem, a cable modem, or digital subscriber line ("DSL") modem) via link 559, through which computer system 520 receives data from and/or transmits data to external sources. As depicted in FIG. 5, input/output interface 546 and modem 554 facilitate the exchange of data with remote computer system 593 via link 552. Link 552 represents a portion of a network and remote computer system 493 represents a node of the network.

While FIG. 5 represents a suitable operating environment for the present invention, the principles of the present invention may be employed in any system that is capable of, with suitable modification if necessary, implementing the principles of the present invention. The environment illustrated in FIG. 5 is illustrative only and by no means represents even a small portion of the wide variety of environments in which the principles of the present invention may be implemented.

In accordance with the present invention, modules including URL dispatchers, content raters, classifiers, and ratings combiners, as well as associated data, including content categories, URLs, and Web page content can be stored and accessed from any of the computer-readable media associated with computer system 520. For example, portions of such modules and portions of associated program data may be included in operating system 535, application programs 536, program modules 537 and/or program data 538, for storage in system memory 522.

When a mass storage device, such as, for example, magnetic hard disk 539, is coupled to computer system 520, such modules and associated program data may also be stored in the mass storage device. In a networked environment, program modules depicted relative to computer system 520, or portions thereof, can be stored in remote memory storage devices, such as, system memory and/or mass storage devices associated with remote computer system 583 and/or remote computer system 593. Execution of such modules may be performed in a distributed environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, a method for dispatching an Internet-content identifier to a content-rating system, the method comprising:
    receiving an indication that at least one unrated Internet-content identifier is available to be rated;
    receiving an indication that one or more computerized content raters are available for rating the at least one unrated Internet-content identifier, wherein the computerized content raters include a plurality of content classifiers configured to rate content based on respective criteria;
    selecting an Internet-content identifier from among the at least one unrated Internet-content identifier based on content-identifier selection criteria;
    selecting one computerized content rater from among the one or more available computerized content raters to rate the selected unrated Internet-content identifier;
    transferring the selected Internet-content identifier to the selected available computerized content rater, wherein the selected Internet-content identifier identifies a portion of content; and
    dynamically determining a content category rating for the selected Internet-content identifier, wherein determining a content category rating comprises dynamically combining a rating for the selected Internet-content identifier with at least one of a rating for an Internet-content identifier identified within the portion of content for the selected Internet-content identifier and an Internet-content identifier for a portion of content that identifies the selected Internet-content identifier.

2. The method as recited in claim 1, wherein indicating that at least one unrated Internet-content identifier is available to be rated comprises indicating that an unrated URL is available to be rated.

3. The method as recited in claim 1, wherein indicating that the one or more computerized content raters are available for rating the at least one unrated Internet-content identifier comprises indicating that the computerized content raters are available to rate an unrated URL.

4. The method as recited in claim 1, wherein selecting the Internet-content identifier based on content-identifier selection criteria comprises selecting the Internet-content identifier randomly.

5. The method as recited in claim 1, wherein selecting the Internet-content identifier based on content-identifier selection criteria comprises selecting a content identifier that has received a threshold number of requests for rating.

6. The method as recited in claim 1, wherein selecting the Internet-content identifier based on content-identifier selection criteria comprises selecting a content identifier that has waited a threshold amount of time to be rated.

7. The method as recited in claim 1, wherein selecting one computerized content rater from among the one or more available computerized content raters to rate the selected unrated Internet-content identifier comprises selecting a computerized content rater to rate an unrated URL.

8. The method as recited in claim 7, wherein selecting the available computerized content rater comprises selecting a computerized content rater that has been idle for a threshold amount of time.

9. The method as recited in claim 7, wherein selecting the available computerized content rater comprises selecting a computerized content rater based on URL specific criteria.

10. The method as recited in claim 1, wherein transferring the selected Internet-content identifier to the selected available computerized content rater comprises transferring an unrated URL to the selected available computerized content rater.

11. The method as recited in claim 1, further comprising:
    determining a content category rating for the selected Internet-content identifier; and
    storing the content category rating along with the Internet-content identifier.

12. A computer program product for use in a computer system, the computer program for implementing a method of dispatching an Internet-content identifier to a content rating system, wherein the computer program product comprises a tangible computer-readable medium having stored thereon computer-executable instructions that, when executed by a processor, perform the following:
    receive an indication that at least one unrated Internet-content identifier is available to be rated;
    receive an indication that one or more computerized content raters are available for rating the at least one unrated Internet-content identifier, wherein the computerized content raters include a plurality of content classifiers configured to rate content based on respective criteria;
    select an Internet-content identifier from among the at least one unrated Internet-content identifier based on content-identifier selection criteria;
    select one computerized content rater from among the one or more available computerized content raters to rate the selected unrated Internet-content identifier;
    transfer the selected Internet-content identifier to the selected available computerized content rater, wherein the selected Internet-content identifier identifies a portion of content; and determine dynamically a content category rating for the selected Internet-content identifier, wherein determining a content category rating comprises dynamically combining a rating for the selected internet-content identifier with at least one of a rating for an Internet-content identifier identified within the portion of content for the selected internet-content identifier and an Internet-content identifier for a portion of content that identifies the selected Internet-content identifier.

13. The computer program product as recited in claim 12, wherein the selected Internet-content identifier comprises a URL.

* * * * *